Patented Feb. 16, 1937

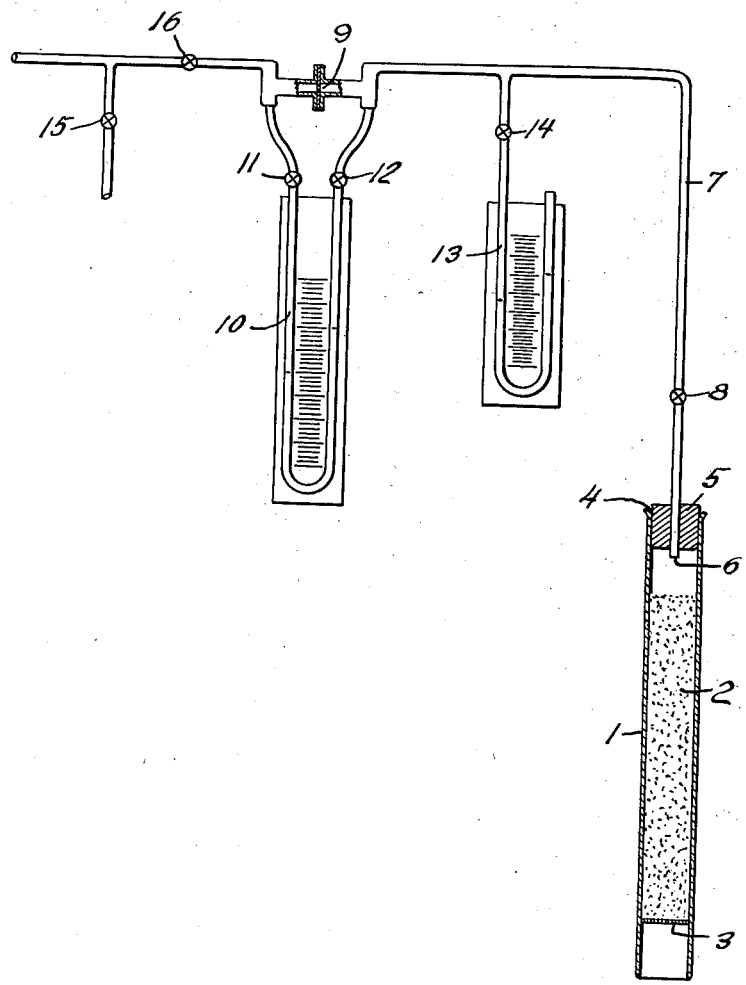

2,070,868

UNITED STATES PATENT OFFICE 2,070,868

PROCESS FOR PACKING CATALYTIC REACTION VESSELS

Hosea H. Smith, Hamburg, N. Y., assignor to National Aniline & Chemical Company, Inc., New York, N. Y., a corporation of New York Application December 12, 1934, Serial No. 757,213

6 Claims. (Cl. 23—288)

This invention relates to a process of preparing a catalytic reaction vessel, having a multiplicity of compartments or tubes containing catalytic material, for reactions in which a fluid material is caused to flow through the several compartments in contact with the catalytic material.

For carrying out catalytic reactions at the present time a type of vessel frequently used is one in which a plurality of narrow compartments or tubes of substantially the same cross-section and length have their opposite ends fixed in tube sheets forming parts of two headers, one from which the fluid passes into all of the tubes and the other into which the fluid leaving the tubes passes. Prior to the initiation of the catalytic reaction the tubes are charged with granular catalytic material. A mixture of gases or other fluids which is to be subjected to the catalytic reaction is conducted to a common header under a given pressure, is divided into a plurality of streams which pass through the tubes in which the gases or fluids contact with the catalytic material and are thereby caused to react. The reacted gases pass from these tubes into the other common header where the streams of reacted gases or fluids merge under a given pressure which is less than that in the aforesaid header.

In catalytic reactions conducted in this way, the course of the reaction and the nature and yield of the product are influenced and determined by many conditions of which an important one is the time during which the gases are in contact with the catalytic material in the tubes. In the type of reaction vessel referred to above, for any individual tube, the velocity at which the gas passes through the tube is dependent upon the difference between the pressure of the gas entering and that of the gas leaving the tube and upon the resistance to flow of gas through the tube. This resistance is dependent upon the amount of the catalytic material in the tube, the size of its granules and the manner in which the material is packed in the tube. Since in the multitubular converters described above there is the same difference in pressure between the gas entering and the gas leaving all of the tubes and since the amount of catalyst is approximately the same in all the tubes, the velocity of the gas through the individual tubes will depend solely upon the resistance to gas flow of the individual tubes. Where, in a reaction vessel containing a multiplicity of tubes, the several tubes exhibit varying resistances, the velocity of the gas through the vessel is not uniform, being less in those tubes having higher resistances. As a result, the catalytic procedure does not take place efficiently.

Prior to the present invention it has been general practice to attempt to assure substantially the same or a regulated velocity of the gas through all the tubes of a reaction vessel by packing each tube with a weighed amount of catalytic material having granules of selected sizes obtained by sifting the material through screens. It has been found however that this procedure does not result in all of the tubes of the reaction vessel having the desired resistance to the flow of the gas entering and leaving the several tubes. Various factors have contributed to the non-uniformity of the packing of the tubes. Despite precautions to assure uniform granular size of the catalyst material the granules may be changed in size by being broken in the process of charging the converter. Also, the way in which the granules of catalytic bearing material were packed down in the several tubes was not uniform even where the granular size of the particles appeared to be the same. Variations of the above nature have resulted in the several tubes having different resistances to gas flow thus causing the reacting gases to remain in contact with the material in some of the tubes a longer period of time than in others.

It has further been noticed that changes in the character of the catalyst in the tubes occur during the course of the reaction resulting in changes in velocity of the gas passing through the several tubes. To correct this condition it has been necessary in the past to remove the catalytic material from all of the tubes and to recharge each tube carefully with a weighed amount of catalytic material of the same granular size. This was a troublesome and costly procedure but was necessary in order to correct the character of the tubes which were at fault.

It is an object of the present invention to provide a method of preparing a catalytic reaction vessel having a multiplicity of compartments or tubes for catalytic reactions so that the flow of gases through the vessel is regulated or uniform and the catalytic reaction is thereby improved.

It is a further object of the present invention to provide a method of preparing the compartments or tubes of a catalytic vessel by which the resistance to gas flow through each tube may be made uniform or may be regulated with respect to that of other tubes. Another object of the invention is to provide a method of preparing the tubes of a catalytic reaction vessel so that in operation the velocity of gas through the several tubes will be substantially the same or, if it should be desired that the velocity of these different groups of tubes differ in a determined relationship, this relationship may be obtained.

Other objects of the invention will in part be obvious and will in part appear hereinafter.

The invention accordingly comprises the several steps and the relation of one or more of such steps with respect to each of the others, which will be exemplified in the process hereinafter described and the scope of the invention will be indicated in the claims.

In accordance with the present invention it has been found that the above enumerated and other objects thereof can be attained efficiently and economically by proceeding in the manner described below.

Where the invention is to be practiced in the initial charging of a catalytic reaction vessel comprising a multiplicity of compartments or tubes, each of the tubes is charged with a catalytic material in the usual manner (i. e., a catalytic material is introduced into each of the compartments or tubes in character and amount uniform with respect to the catalytic material introduced into each of the other compartments or tubes or which differs in a predetermined desired manner from that introduced into each of the other compartments or tubes) and each tube is then subjected to a test to determine the resistance offered by the catalyst material to the flow of a fluid therethrough, in terms of the differential in the pressure of the fluid before it enters and after it leaves the tube. The several tubes are tested under comparable conditions, which may be obtained by causing a fluid which is supplied at a uniform pressure to each tube under test to flow through the tube into an area of a lower and substantially uniform pressure. The character and condition of the catalyst material in each tube is then adjusted by tamping, removing, adding to, or replacing the catalyst material until the tube has a pressure differential corresponding to an adopted standard. By proceeding in this way each tube of a vessel containing a multiplicity of tubes can be adjusted to have the same pressure differential or, if desired, regulated pressure differentials with respect to the other tubes, and thus the velocity of a gas supplied to and withdrawn from the several tubes of the reaction vessel at the same pressures may be substantially uniform through all the tubes or differ to a predetermined desired degree.

The invention also may be utilized for correcting the condition of the compartments or tubes of a catalytic reaction vessel when during operations it is discovered that flow of gases through the several tubes has become irregular due to changes in the resistance to gas flow of the several tubes. This irregularity of flow may be evidenced by variations in the rate of production, by a degradation in the quality of the product of the reaction when all conditions of operation are apparently maintained uniform, by an increase or decrease in the differential pressures between the gas entering and leaving the converters, etc. By practicing the present invention the necessity of emptying and recharging all of the tubes, as was prior practice, is avoided since by determining the resistance to the flow of a gas entering and leaving each tube, it is possible to detect those tubes in which the character of the catalytic material has changed during the reaction, and to prepare the catalytic vessel for further reaction it is only necessary to adjust these tubes without disturbing the tubes found to be satisfactory.

For a fuller understanding of the nature and objects of the invention reference should be had to the following detailed description taken in connection with the accompanying drawing in which the single figure is a view, partly in section, representing in more or less diagrammatic form an apparatus suitable for employment in carrying out the process of the present invention.

In the drawing, the numeral 1 represents a catalytic reactor tube which it is to be understood is a single tube of a catalytic reaction vessel having a plurality of such tubes. The tube 1 is shown packed with a desirable quantity of a catalyst material 2, which is supported on a suitable foraminous support 3. The procedure described hereinafter may be practiced whether the tube 1 has been initially charged or has been employed for a catalytic reaction in which the flow of gases through the catalytic reaction vessel has become irregular. To determine the differential in the pressures of a gas entering and leaving the tube 1, the upper opening 4 of the tube 1 is connected by a suitable gas-tight temporary joint 5 to the end 6 of a gas conducting pipe 7 through which a suitable gas can be conducted at uniform pressure to the top of tube 1. As shown, the bottom of tube 1 is open to the atmosphere through the foraminous support 3 but the bottom of the tube may, if desired, be connected to a system which is uniformly maintained at any given pressure below that of the gas in the pipe 7. The pipe 7 just above its entrance into the tube 1 is provided with a valve 8 and at its opposite end is connected through an orifice 9 to a source of a substantially uniformly compressed gas which is not injurious to the catalyst. Air may frequently be employed. To regulate the pressure of the gas, valves 15 and 16 are provided. Attached to the pipe 7 at each side of orifice 9 there is a pressure gauge 10, the arms of which have valves 11 and 12. The orifice 9 and valves 15 and 16 comprise a conventional assembly for regulating the flow of gas into pipe 7, so that when valve 8 is closed, the pressure in pipe 7 can be maintained uniformly at a desired selected standard pressure. Gauge 10 is a conventional device for measuring the difference of pressures of gas on each side of the orifice 9. For convenience in measuring the pressure of gas in pipe 7, a manometer 13 provided with a valve 14 is disposed between the orifice 9 and the valve 8. It will be understood that for the gauge 10 and manometer 13, any suitable gauges adapted to measure accurately the pressure of gases on each side of orifice 9 may be substituted.

In employing the apparatus described for carrying out the present invention, pipe 7 is connected at joint 5 to a tube 1 containing a standard quantity of catalyst material. The valves 15 and 16 are adjusted to allow a gas from a supply under substantially uniform pressure to enter pipe 7 through the orifice 9, and to obtain a desired pressure in pipe 7 which is indicated by manometer 13. Valve 8 is then opened to an exact and known extent and the gas flows under pressure from pipe 7 through tube 1. Since the gas enters pipe 7 at a previously determined uniform rate through orifice 9, the fall of pressure in pipe 7, which is observed on manometer 13, is proportional to the rate of flow of gas through the tube 1, and therefore to the resistance which the catalyst material in the tube offers to the flow of gas through it. This fall in pressure is noted for the standard packed tube, and becomes the standard reading by which the resistance of the catalyst material, and its packing in the other tubes may be measured. Replacing tube 1 with another tube containing the same weight or volume of catalyst, if the fall of pressure as read on manometer 13 differs from the standard, the catalyst material in the tube is adjusted so that the manometer reading is the same as that determined for the standard tube, and the resistance to gas flow through the tube is thus adjusted to be the same as that of the standard tube. The procedure described involves the measurement of the differential pressure of a gas flowing through the catalyst tubes under comparable conditions.

The changes in readings of manometer 13 will be accompanied by proportional changes in the readings on gauge 10, and therefore if it is convenient or so desired the changes in differential readings throughout the tests on gauge 10 may be used as the indications of the differential pressures of the gas flowing through each tube, and the packing of the tube adjusted to obtain the same rate of flow as that obtained with the standard tube attached to pipe 7. The pressure of the gas supplied to pipe 7 is checked from time to time by closing valve 8 and reading the pressure registered by manometer 13 and the base reading on gauge 10. These pressure readings should correspond to the readings for the adopted standard of pressure in pipe 7 with valve 8 closed and the gas supplied through the orifice 9 to pipe 7 from the gas supply at the substantially uniform pressure. By adjusting valves 15 and 16, a deviation in pressure of the gas from the standard may be compensated for.

In determining the differential pressures of the tubes of a reaction vessel in accordance with the present invention, it will be apparent that the invention is not restricted to the procedure specifically outlined above. For example, any device or arrangement for supplying gas to pipe 7 at a uniform pressure as indicated by manometer 13 can be used. With an adopted standard rate of flow of gas, the fall in pressure as read on manometer 13 in the course of a test would then be a measure of the differential pressure of the gas passing through tube 1. Further, the resistance to flow of gas through a tube by the catalytic material in it can be measured by the difference of pressures of a gas at entering and leaving a catalytic tube or compartment. This difference may be measured by connecting the top and bottom of a tube or compartment, respectively, to the two arms of a manometer which will then show directly the differential pressure of the gas entering and leaving the tube or compartment.

When it is desired to employ tubes containing different weights or volumes of catalyst material, substantially equal velocities of the gas through the several tubes are insured by testing the several tubes in the manner described above, and for each tube the resistance to flow of gas as measured by the differential pressure is adjusted for each of the several tubes at the standard and the packing of the catalyst material in the tubes is adjusted to give this standard pressure reading on manometer 13.

In the case of a catalytic reactor in which the gases entering and leaving the tubes are conducted to and away from the tubes by common headers and it is desired that the differential pressure of the tubes should be uniform so that the gas flow through the several tubes will be uniform, one of the tubes is selected as a standard and the other tubes would then be adjusted to conform to this standard in the manner described above. Where it is desired to have groups of tubes with different differential pressures, the several tubes in each group will be tested against a standard tube for that group.

The invention thus affords a method of preparing the compartments or tubes of a catalytic reaction vessel for a reaction which may be uniformly carried out since the rate of flow of gases through each tube may be accurately determined and controlled either before or at any time during use of the vessel that the control of the rate of flow becomes necessary or desirable. Further, once the standards are determined by which the tubes are tested using an apparatus such as described above, this same apparatus may be used for testing tubes of different converters or for different chargings of the same converter, to insure like conditions of packing the catalyst with respect to resistance to gas flow.

Since in carrying out the above process certain changes may be made without departing from the scope of the invention, it is intended that all matter contained in the above description shall be interpreted as illustrative and not in a limiting sense.

I claim:

1. The process for preparing a reaction vessel for use in carrying out a catalytic treatment of a fluid, in which vessel a plurality of bodies of catalytic material occupies a plurality of separate compartments, the fluid to be treated passes from a unitary body of the same through the catalytic material occupying said compartments as a plurality of streams of fluid, the several streams of fluid after passing through the several compartments merge into a second unitary body of fluid and the flow of each of said streams through its respective compartment is induced by the differential pressure between the aforesaid unitary bodies of fluid, that improvement which comprises introducing into each of said compartments catalytic material in predetermined character and amount with respect to the character and amount of the catalytic material introduced into each of the other compartments and then adjusting the resistance of the catalytic material in said compartments to the flow of a fluid therethrough by comparison with a predetermined standard differential in the pressure of a fluid entering and leaving the compartment containing the catalyst, to pass said last mentioned fluid through each of said compartments at a predetermined velocity.

2. A method of charging a multiple tube catalytic reaction vessel in which the flow of gas through a plurality of tubes is induced by the pressure differential between a body of gas from which portions of the gas flow to the several tubes and a body of gas formed by merging the gas streams leaving said tubes, which comprises introducing into each of a plurality of tubes of said vessel a body of solid particles of catalytic material in predetermined character and amount with respect to the character and amount of the catalytic material introduced into each of the other tubes, determining for each of said tubes thus packed with catalytic material the differential in the pressure of a gas entering and leaving the tube and adjusting the resistance of the catalytic material in the tube to the flow of said last mentioned gas therethrough by comparison with a predetermined standard differential in the pressure of the gas entering and leaving the tube containing the catalyst, to pass said last mentioned gas through each of said tubes at a predetermined velocity.

3. The process for preparing a reaction vessel for use in carrying out the catalytic treatment of a gas in which vessel a catalyst material occupies a plurality of separate compartments in the vessel and the gas to be treated enters each compartment at the same pressure and passes from the compartment at a pressure which is the same as that at which the gas leaves each of the other compartments, which comprises introducing into each of said compartments a catalytic material in predetermined character and amount and adjusting the resistance of the catalytic material in each of said compartments to the flow of a fluid therethrough by comparison with a predetermined standard differential in the pressure of the fluid entering and leaving each compartment.

4. The process for regulating the catalytic treatment of a gas in a reaction vessel in which catalytic material of predetermined character and amount occupies each of a plurality of separate compartments and the gas to be treated enters each compartment at the same pressure, passes through the compartments, and leaves the compartment at a pressure which is the same as the pressure at which the gas leaves each of the other compartments, which comprises interrupting the flow of gas through said vessel and adjusting the resistance of the catalytic material in one or more of said compartments to the flow of a fluid therethrough by comparison with a predetermined standard differential in the pressure of a gas entering and leaving a compartment, to pass said last mentioned gas through each of the compartments at a predetermined velocity.

5. The process for preparing a reaction vessel for use in carrying out a catalytic treatment of a fluid, in which vessel a plurality of bodies of catalytic material occupies a plurality of separate compartments, the fluid to be treated passes from a unitary body of the same through the catalytic material occupying said compartments as a plurality of streams of fluid, the several streams of fluid after passing through the several compartments merge into a second unitary body of fluid and the flow of each of said streams through its respective compartment is induced by the differential pressure between the aforesaid unitary bodies of fluid, that improvement which comprises introducing into each of said compartments catalytic material uniform in character and in amount with respect to the catalytic material introduced into each of the other compartments and then adjusting the resistance of the catalytic material in said compartments to the flow of a fluid therethrough by comparison with a predetermined standard differential in the pressure of a fluid entering and leaving the compartment containing the catalyst, to pass said last mentioned fluid through each of said compartments at the same predetermined velocity.

6. A method of charging a multiple tube catalytic reaction vessel in which the flow of gas through a plurality of tubes is induced by the pressure differential between a body of gas from which portions of the gas flow to the several tubes and a body of gas formed by merging the gas streams leaving said tubes, which comprises introducing into each of a plurality of tubes of said vessel a body of solid particles of catalytic material uniform in character and in amount with respect to the catalytic material introduced into each of the other tubes, determining for each of said tubes the differential in the pressure of a gas entering and leaving the tube thus packed with catalytic material and adjusting the resistance of the catalytic material in the tube to the flow of gas therethrough by comparison with a predetermined standard differential in the pressure of the gas entering and leaving the tube containing the catalyst, to pass said last mentioned gas through each of said tubes at the same predetermined velocity.

HOSEA H. SMITH.